(12) United States Patent
Moroney

(10) Patent No.: US 7,386,128 B2
(45) Date of Patent: Jun. 10, 2008

(54) CONDITIONAL ACCESS SYSTEM PROVIDING ACCESS TO MULTIPLE PROGRAMS OR SERVICES

(75) Inventor: Paul Moroney, Encinitas, CA (US)

(73) Assignee: General Instrument Corporation, Horsham, PA (US)

( * ) Notice: Subject to any disclaimer, the term of this patent is extended or adjusted under 35 U.S.C. 154(b) by 269 days.

(21) Appl. No.: 11/025,304

(22) Filed: Dec. 29, 2004

(65) Prior Publication Data

US 2006/0143448 A1 Jun. 29, 2006

(51) Int. Cl.
H04N 7/167 (2006.01)
H04K 1/00 (2006.01)
H04L 9/00 (2006.01)

(52) U.S. Cl. .................. 380/210; 380/239; 725/31
(58) Field of Classification Search .................. None
See application file for complete search history.

(56) References Cited

U.S. PATENT DOCUMENTS

| | | | |
|---|---|---|---|
| 4,613,901 A | 9/1986 | Gilhousen et al. | 358/122 |
| 4,864,615 A | 9/1989 | Bennett et al. | 380/21 |
| 5,111,504 A | 5/1992 | Esserman et al. | 380/21 |
| 5,420,866 A * | 5/1995 | Wasilewski | 370/426 |
| 5,485,577 A | 1/1996 | Eyer et al. | 395/188.01 |
| 6,041,056 A * | 3/2000 | Bigham et al. | 370/395.64 |
| 6,170,005 B1 | 1/2001 | Meandzija | 709/217 |
| 6,363,149 B1 | 3/2002 | Candelore | 380/45 |
| 6,430,290 B1 | 8/2002 | Van Willigen et al. | 380/1 |
| 6,516,412 B2 | 2/2003 | Wasilewski et al. | 713/138 |
| 6,584,199 B1 | 6/2003 | Kim et al. | 380/203 |
| 6,637,027 B1 | 10/2003 | Breslauer et al. | 725/25 |

(Continued)

FOREIGN PATENT DOCUMENTS

EP 1480458 A2 * 11/2004

OTHER PUBLICATIONS

Heredia, Edwin A., "The ATSC Standard for Conditional Access," Corporate Research, Thomson Multimedia/RCA, 8 pp., undated but before the filing date of this application.

(Continued)

Primary Examiner—Christopher Revak
(74) Attorney, Agent, or Firm—Stewart M. Wiener

(57) ABSTRACT

A conditional access subsystem is proved which is to reside with an end-user for receiving, decrypting and decoding all programs distributed by a content provider that the end user is entitled to access so that the decrypted and decoded programs are available for display on one or more display devices without use of a set-top terminal dedicated to each of the display devices. The subsystem includes a receiver for receiving and demodulating a multi-program transport (MPTS) stream distributed by the content provider. The MPTS includes a plurality of packets constituting a plurality of programs using one of N different encryption schemes each associated with one of N service tiers, wherein N is an integer greater than one. Each of the N different encryption schemes has a different encryption/decryption key associated therewith. The packet identifiers for the packets associated with programs in any given one of the service tiers are in a consecutive sequence. A decryptor is provided for decrypting each of the programs associated with each of the N service tiers that the end user is entitled to access. A decoder is also provided for decoding each of the decrypted programs.

11 Claims, 2 Drawing Sheets

U.S. PATENT DOCUMENTS

| | | | |
|---|---|---|---|
| 6,697,489 B1* | 2/2004 | Candelore | 380/200 |
| 6,738,905 B1 | 5/2004 | Kravitz et al. | 713/194 |
| 6,911,974 B2* | 6/2005 | Asano et al. | 345/204 |
| 7,039,938 B2* | 5/2006 | Candelore | 725/87 |
| 7,058,819 B2* | 6/2006 | Okaue | 713/193 |
| 7,088,822 B2* | 8/2006 | Asano | 380/45 |
| 7,116,785 B2* | 10/2006 | Okaue | 380/278 |
| 7,139,398 B2* | 11/2006 | Candelore et al. | 380/200 |
| 7,151,831 B2* | 12/2006 | Candelore et al. | 380/200 |
| 7,155,012 B2* | 12/2006 | Candelore et al. | 380/214 |
| 7,167,564 B2* | 1/2007 | Asano et al. | 380/279 |
| 7,191,346 B2* | 3/2007 | Abe et al. | 713/194 |
| 7,203,968 B2* | 4/2007 | Asano et al. | 726/31 |
| 7,233,669 B2* | 6/2007 | Candelore | 380/210 |
| 2002/0083438 A1* | 6/2002 | So et al. | 725/31 |
| 2002/0090090 A1 | 7/2002 | Van Rijnsoever et al. | 380/279 |
| 2002/0170072 A1* | 11/2002 | Lundbald et al. | 725/131 |
| 2003/0005435 A1 | 1/2003 | Nelger et al. | 725/31 |
| 2003/0021412 A1 | 1/2003 | Candelore et al. | 380/217 |
| 2003/0108199 A1* | 6/2003 | Pinder et al. | 380/200 |
| 2003/0200548 A1* | 10/2003 | Baran et al. | 725/90 |
| 2003/0217362 A1* | 11/2003 | Summers et al. | 725/63 |
| 2004/0083177 A1 | 4/2004 | Chen et al. | 705/50 |
| 2004/0156507 A1* | 8/2004 | Dellow et al. | 380/277 |
| 2004/0237099 A1* | 11/2004 | Shin et al. | 725/31 |

OTHER PUBLICATIONS

Application of Smart Card in Conditional Acceptance System. 2 pp. http://www.mwcard.com/english/services/whitebook7.htm. Aug. 24, 2004 download.

Scrambling (Conditional Access System), *Broadcast Technology*, No. 12, Autumn 2002, pp. 10-13.

Massel, Mark, Conditional Access. Broadcast Engineering 2000 News Archive. Oct. 1, 2001, 4 pp. http://2000newsarchive.broadcastengineering.com/ar/broadcasting_conditional_access. Aug. 24, 2004 download.

Broberg, David, Standardizing Extended Copy Control Instruction Messages—A Bad Idea. May 16, 2001. http://www.geocities.com/ResearchTriangle/3930/ExCCI_bad-ides.PDF. Apr. 13, 2004 download.

Tektronix. A Guide to MPEG Fundamentals and Protocol Analysis (including DVB and ATSC). www.tektronix.com/video_ audio. ©2000.

* cited by examiner

CONDITIONAL ACCESS SYSTEM PROVIDING ACCESS TO MULTIPLE PROGRAMS OR SERVICES

FIELD OF THE INVENTION

The present invention relates generally to broadcast systems such as a CATV system, and more particularly to a conditional access system employed in a broadcast system.

BACKGROUND OF THE INVENTION

Information broadcast systems include subscription-based systems in which a user subscribes to a broadcast system that provides programming or other content to the subscriber through a cable network or a satellite dish, for example. Since the programming is broadcast, it is transmitted once for receipt by all eligible receivers. Access to the data, however, is conditional, depending, for example, on whether or not a subscription fee has been paid for a specific receiver. Such conditional access to the content is realized by encrypting the information (usually the encryption occurs in the transmitter) under control of an authorization key and by transmitting the encrypted content to the receivers. Furthermore, the decryption keys necessary for the decryption of the content are encrypted themselves and transmitted to the receivers. Often, symmetrical encryption techniques are used, where the encryption and decryption keys are the same. Only those receivers that are entitled to the content are able to decrypt the decryption key using a first decryptor. The receivers can then decrypt the content using a second decryptor for decrypting the content under control of the authorization key.

Conditional access is provided by conditional access (CA) systems that come as matched sets—one part is integrated into the cable system headend (in a cable broadcast system) and encrypts premium content, the other part provides decryption and is built into the set-top boxes installed in user's homes. Several CA systems are used in the cable industry, including those provided by Motorola (Schaumberg, Ill.), Scientific Atlanta (Atlanta, Ga.) and NDS (Staines, U.K.).

To receive encrypted services a user needs a set-top box for each and every television in his or her residence. Each set-top box must be connected to the cable or satellite system over which the multi-service operator (MSO) provides programming. The more televisions a user has, the more set-top boxes that are required. The only exception today is in cable systems that offer some analog TV channels in the clear (i.e. unprotected). Any television built in the last 20 years can receive such channels directly (i.e., without a set-top box). Without the set-top box, however, such a television could of course only receive analog channels, but most MSOs offer upwards of 80 such channels today.

Long term, these MSOs would prefer to reclaim all currently transmitted analog television channels and replace them with far denser compressed digital services. Unfortunately, a completely digital television system means that the consumer needs a set-top for every television he or she has in the home. This requirement has intensified focus on lower and lower cost set-top boxes, and has also contributed to the drive towards televisions that are digital cable ready, that is, with set-top technology inside them.

Recently, a new architecture has emerged that would avoid the need for a set-top box per television. In this architecture the system operator installs a terminal on the side of the residence, in the path of the cable feed to the residence. The terminal receives the 80 digital channels supplied by the MSO and converts them to 80 analog channels that are modulated conventionally on the in-home coax. The MSO thus has the benefit of carrying all channels in a digitally compressed format, allowing more total services and revenue, while the residence would appear as it does today, with 80 analog channels feeding as many in-home televisions as the user wishes. No set-top boxes would be required until the consumer wished to access encrypted content such as premium programming (e.g., HBO™) or video-on-demand, for example. The user would not even be aware that the residential-side terminal was present, since no special in-home equipment is required and there would be no direct user interaction with the terminal.

A multiple service, residential-side terminal would need to tune, demodulate, decode, and output (as an analog RF signal) many programs simultaneously. Currently, the number of programs might be as high as 80 or more for many cable systems. Proponents of such an arrangement need to find techniques for efficiently performing these various processing steps on such a large number of programs at reduced cost. After all, an architecture requiring a set-top box per television would be the least expensive and therefore the preferable approach if a residential-side terminal were too expensive. Schemes are currently in development for tuning, demodulation, decoding, and upconversion that hold the promise of performing these functions at a reasonable cost. In the case of decryption and CA, residential-side terminal proponents are considering totally new approaches that may be incompatible with (and less secure than) legacy CA systems that are currently deployed in set-top boxes.

Accordingly, it would be desirable to provide a method and apparatus for providing conditional access that is compatible with existing conditional access schemes employed in set-top boxes and which can also serve to simultaneously decrypt all the channels that the subscriber is entitled to access so that a complete set of analog channels can be provided to the various televisions in the user's residence, at low cost and complexity.

SUMMARY OF THE INVENTION

In accordance with the present invention, a method and apparatus is provided for distributing a plurality of programs from a content provider device to a subscriber. Each of the programs is assigned to one of N service tiers, N being an integer greater than 1. The method begins by assigning a unique packet identifier to each packet type associated with a given program. Each of the plurality of programs is encrypted using one of N different encryption schemes each associated with one of the N service tiers. Each of the N different encryption schemes has a different encryption/decryption key associated therewith. The packet identifiers for the packets associated with programs in any given one of the service tiers are in a consecutive sequence. A multi-program transport stream (MPTS) is assembled that includes the packets associated with the plurality of encrypted programs and the encryption/decryption keys. The MPTS is distributed from the content provider to the subscriber.

In accordance with one aspect of the invention, the packet identifiers associated with the packets in any given one of the service tiers differ only in wild card digits.

In accordance with another aspect of the invention, the MPTS is MPEG compliant.

In accordance with another aspect of the invention, the encryption/decryption keys are encapsulated in an entitlement control message (ECM).

In accordance with another aspect of the invention, the MPTS further comprises entitlement management message (EMM) packets associated with the subscriber.

In accordance with another aspect of the invention, a conditional access subsystem is proved which is to reside with an end-user for receiving, decrypting and decoding all programs distributed by a content provider that the end user is entitled to access so that the decrypted and decoded programs are available for display on one or more display devices without use of a set-top terminal dedicated to each of the display devices. The subsystem includes a receiver for receiving and demodulating a multi-program transport (MPTS) stream distributed by the content provider. The MPTS includes a plurality of packets constituting a plurality of programs using one of N different encryption schemes each associated with one of N service tiers, wherein N is an integer greater than one. Each of the N different encryption schemes has a different encryption/decryption key associated therewith. The packet identifiers for the packets associated with programs in any given one of the service tiers are in a consecutive sequence. A decryptor is provided for decrypting each of the programs associated with each of the N service tiers that the end user is entitled to access. A decoder is also provided for decoding each of the decrypted programs.

DETAILED DESCRIPTION

Figure 1:
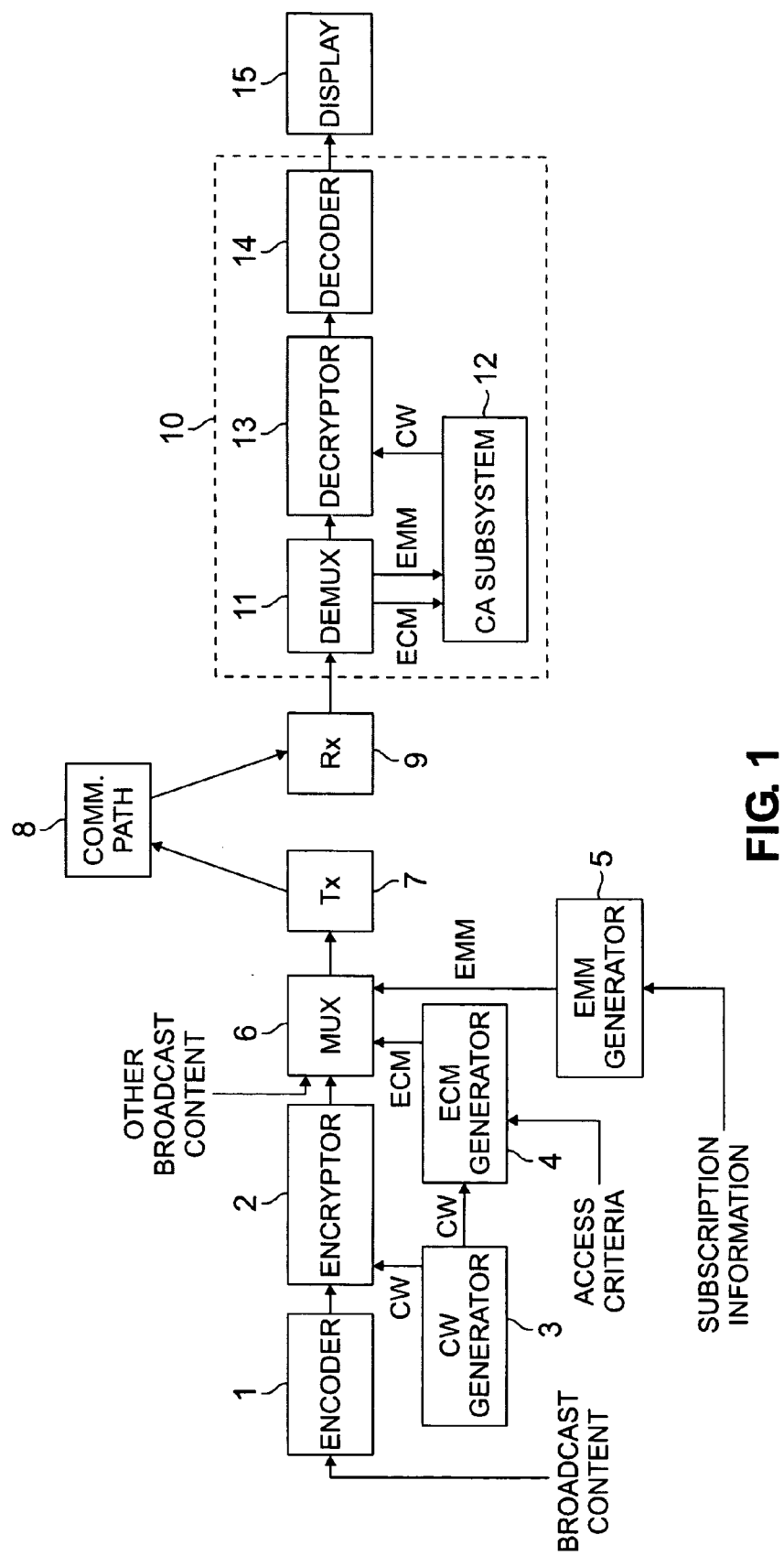
FIG. 1 shows a conventional conditional access system in which the present invention may be employed.

Referring to FIG. 1, in a conventional conditional access system, content to be broadcast, including for example, video, audio and data components, is encoded in an encoder 1 using an appropriate coding system, for example MPEG-II for digital broadcasting. The encoded broadcast stream is encrypted or scrambled in an encryptor 2 under the control of a set of control words CW generated by a control word generator 3 in a manner which is well-known per se. Each control word CW is an encrypted key that is required to both encrypt and decrypt the encoded broadcast stream. Each control word is incorporated into an Entitlement Control Message (ECM) by an ECM generator 4 together with access criteria that identify the service and the conditions required to access the service. For example, the access criteria may specify regional limitations on the broadcast. Alternatively, the ECM generator may generate the control words directly. A further type of message, referred to as an Entitlement Management Message (EMM), which carries details of the subscriber and his or her subscription is generated by an EMM generator 5. While an ECM message is associated with an encrypted program or a set of programs and carries the information required to decrypt those programs, an EMM message is a message dedicated to an individual user or group of users and carries the information necessary to determine whether those users have the necessary subscriptions in place to be able to view the program.

The encrypted and encoded broadcast stream, together with the ECM and EMM messages, is multiplexed in a multiplexer 6 with other broadcast streams representing other programs, together making up a multi-program transport stream (MPTS). The MPTS is sent to a transmitter 7 from which it is transmitted, via a communications channel 8, for example a satellite or cable channel, using an appropriate modulation scheme. The modulated MPTS is received at a subscriber's receiver 9, for example a satellite dish, and passed to the subscriber's set-top box 10.

On receipt at a set-top box 10, the received signal is demodulated and the MPTS data is demultiplexed in a demultiplexer 11 to extract the required program and its associated ECM and EMM messages. The extracted ECM and EMM messages are sent to a CA subsystem 12. The CA subsystem 12 uses the ECM and EMM messages to determine whether the subscriber has the right to view the broadcast and if so, to reproduce the control words CW, which are input to a decryptor 13 together with the encrypted broadcast stream to recover the original MPEG-II encoded broadcast stream. The encoded stream is passed to an MPEG-II decoder 14, which produces an output signal comprising audio, video and data components for display and use at the subscriber's television 15.

Each control word typically is generally a random number that serves as an encrypted key. The control word is typically changed at predetermined intervals. A continuous stream of ECM messages is therefore required to decrypt the encrypted signal. The EMM message is updated far less frequently than the ECM messages. Support for the carriage of ECM and EMM messages is defined in the international standard ISO IEC 13818-1, the entire contents of which are incorporated herein by reference.

It will be understood that the function of the various components of the conditional access system, including set-top box 10, shown in FIG. 1 may be carried out using hardware, software, firmware, or any combination thereof. That is, the particular functional elements set forth in FIG. 1 are shown for purposes of clarity only and do not necessarily correspond to discrete physical elements.

The packets in an encoded broadcast stream that employs the MPEG-II coding system may be classified into three types: program elementary stream (PES) packets, program specific information (PSI) packets, and privately defined packets. PES packets are typically used to carry audio, video, or data that is associated with a particular program, whereas PSI packets are used to carry, among other things, so-called PSI data, which includes MPEG-2 System Tables such as the program association table (PAT), the program map table (PMT) and the conditional access table (CAT). A transport stream refers to a series of program elementary streams that are multiplexed together along with the associated program specific information, and other data such as ECMs and EMMs.

Figure 2:
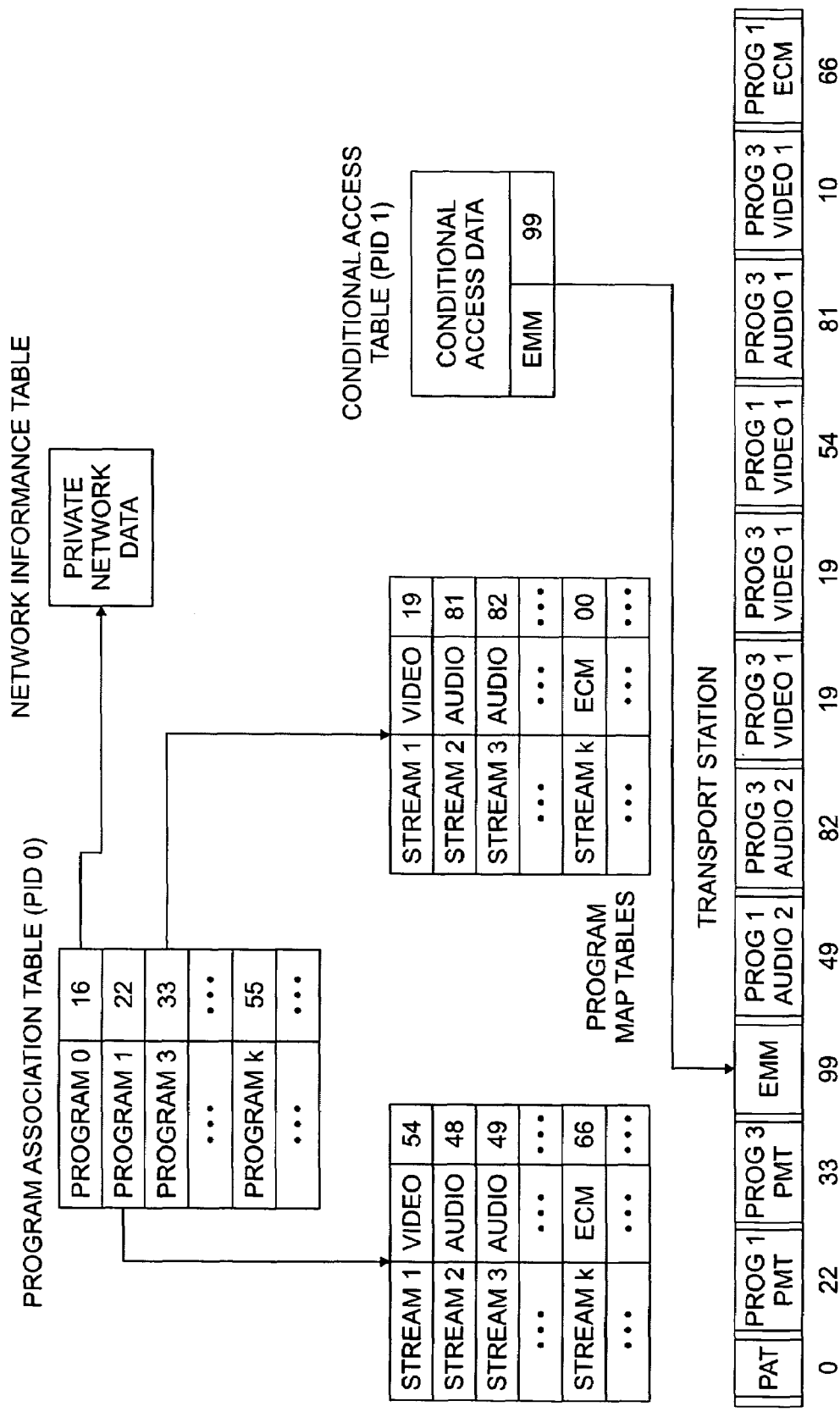
FIG. 2 shows an exemplary MPEG-II transport stream, which includes the PES, the PAT, PMT and CAT packets.

The PAT describes the number of programs in a transport packet stream and determines how to the find the associated PMT for each program. Consequently, each transport stream contains one PAT and several PMTs (one for each program). The PMT describes the elementary streams that compose an individual program. The packets that make up an elementary stream can be recognized by their Packet Identifier (PID) value. The PID is a field located in the header of every transport stream packet. Thus, information pertaining to a single program can be selected by selecting those packets having the appropriate PIDs for the program's video, audio and data, as well as its ECM stream. The PMT contains a program number that identifies the program within the multiplex, descriptors to carry additional information about the program, the identification of the packets that contain the synchronization information, a number of pairs of values (e.g., stream type (ST), PID) which, for each stream, specify the ST and the PID of the packets containing the data of that stream. In addition, the CAT contains the PIDs of those packets in which the EMM messages are located. FIG. 2 shows an exemplary transport stream, which includes the PES, the PAT, PMT and CAT packets. FIG. 2 also shows exemplary PAT, MPT and CAT tables associated with this transport stream. As the figure indicates, in the MPEG-II transport standard the PAT packets are always identified as PID 0, and the CAT packets are always identified as PID 1.

A set-top box used in a conventional conditional access system that employs MPEG-II encoding can generally only provide access to a limited number of programs (e.g., 1-4) at any given time. Thus, as previously mentioned, upwards of N (e.g., 80) conditional access sub-systems would be required to simultaneously provide the customer with N programs (assuming that each conditional access sub-system can only process one program at any given time). Even if the conditional access sub-system could process four programs simultaneously, twenty conditional access sub-systems would still be required in each set-top box to provide simultaneous access to all 80 programs.

Today, these non-premium analog channels are generally made available to customers by MSOs in a limited number of different service tiers. For example, MSOs often offer only two service tiers, one for basic programming and another for extended basic programming. The present inventor has recognized that the aforementioned limited capability of current set-top boxes to simultaneously provide access to all the programs made available by MSOs can be overcome by encrypting the programming in a limited number of groups. The number of different groups in which the programs are encrypted should be equal to the number of service tiers offered by the MSO. For example, if a given MSO only offers two service tiers for basic and extended basic programming, then the programs will only need to be encrypted in two groups—one group for encrypting the basic programs and the other group for encrypting the extended basic programs.

Assuming a CA subsystem can process 2 programs simultaneously, it in principle can be used to provide simultaneous access to all programs offered by the MSO when those programs are encrypted in either of two groups. In this way the CA subsystem can serve in a residential-side terminal that can provide both conditional access and a complete set of analog channels to the residence. Such encryption can be accomplished at the cable network headend by using only two ECMs (one for each of the groups) to encrypt all of the programs that are offered. Each ECM would define the service tier necessary to access the basic channels or the extended basic channels. The two different ECM packets would each have their own PIDs. The PMT associated with each program would list the appropriate PID for the relevant ECM packet, making the transport stream fully MPEG compliant.

In order for a single conditional access subsystem of a set-top box to simultaneously decrypt, say, 80 programs, the subassembly would need to accept a transport stream with roughly 150 to 200 Mbps and select the PIDs associated with the PES packets of each program. That is, for the entire transport stream the subassembly might need to select 80 PIDS corresponding to the video packets and 80 PIDs corresponding to the audio packets. There may also be multiple audios per program, or even associated encrypted data streams.

While current set-top boxes can generally handle from about 50 to 160 Mbps, they can only support a relatively small number of independent PIDs. For example, one current generation of devices can support 4 programs simultaneously and up to 32 individual PIDs. The PIDs may be assigned to each program in any way that is desired. For instance, 8 PIDs can be assigned to each of the 4 programs, or 10 PIDs can be assigned to the first 3 programs and 2 PIDs to the last program. In order to make available a sufficient number of PIDs needed to decrypt 80 programs, in some embodiments the present invention may employ a "wild card" feature of the PID registers. That is, the 32 available PID registers, which consist of 13 bits each, can support a 4 bit "don't care" setting in which all 16 incoming PIDs with the same top 9 bits and the various possible bottom 4 bits will match to the register, allowing support for a total of 128 (32×4) PIDs. To employ such a wild-card scheme, the encoding or multiplexing equipment would need to be configured to set the relevant PIDs in such an adjacent manner. That is, the packets associated with programs in each of the different service tiers need to employ a consecutive block of PIDs, which are assigned by encoder or multiplexing equipment.

The invention claimed is:

1. A method of distributing a plurality of programs from a content provider device to a subscriber, each of the programs being assigned to one of N service tiers, N being an integer greater than 1, the method comprising the steps of:

assigning a unique packet identifier to each packet type associated with a given program;

encrypting each of the plurality of programs using one of N different encryption schemes each associated with one of the N service tiers, each of said N different encryption schemes having a different encryption/decryption key associated therewith, and wherein the packet identifiers for the packets associated with programs in any given one of the service tiers are in a consecutive sequence;

assembling a multi-program transport stream (MPTS) that includes the packets associated with the plurality of encrypted programs and the encryption/decryption keys; and distributing the MPTS from the content provider to the subscriber.

2. The method of claim 1 wherein the packet identifiers associated with the packets in any given one of the service tiers differ only in wild card digits.

3. The method of claim 1 wherein the MPTS is MPEG compliant.

4. The method of claim 1 wherein the encryptionldecryption keys are encapsulated in an entitlement control message (ECM).

5. The method of claim 1 wherein the MPTS further comprises entitlement management message (EMM) packets associated with the subscriber.

6. A conditional access subsystem to reside with an end-user for receiving, decrypting and decoding all programs distributed by a content provider that the end user is entitled to access so that the decrypted and decoded programs are available for display on one or more display devices (15) without use of a set-top terminal dedicated to each of the display devices, comprising:

a receiver (11) for receiving and demodulating a multi-program transport (MPTS) stream distributed by the content provider, said MPTS including a plurality of packets constituting a plurality of programs using one of N different encryption schemes each associated with one of N service tiers, wherein N is an integer greater than one, each of said N different encryption schemes having a different encryptionldecryption key associated therewith, and wherein packet identifiers for the packets associated with programs in any given one of the service tiers are in a consecutive sequence;

a decryptor (13) for decrypting each of the programs associated with each of the N service tiers that the end user is entitled to access; and a decoder (14) for decoding each of the decrypted programs.

7. The conditional access subsystem of claim 6 wherein the packet identifiers associated with the packets in any given one of the service tiers differ only in wild card digits.

8. The conditional access subsystem of claim 6 wherein the MPTS is MPEG compliant.

9. The conditional access subsystem of claim 6 wherein the encryptionldecryption keys are encapsulated in an entitlement control message (ECM).

10. The conditional access subsystem of claim 6 wherein the MPTS further comprises entitlement management message (EMM) packets associated with the end user.

11. A method for providing to one or more display devices of an end-user all programs distributed by a content provider that the end user is entitled to access without use of a set-top terminal dedicated to each of the display devices, said method comprising the steps of:

receiving and demodulating a multi-program transport (MPTS) stream distributed by the content provider, said MPTS including a plurality of packets constituting a plurality of programs using one of N different encryption schemes each associated with one of N service tiers, wherein N is an integer greater than one, each of said N different encryption schemes having a different encryptionldecryption key associated therewith, and wherein packet identifiers for the packets associated with programs in any given one of the service tiers are in a consecutive sequence;

decrypting each of the programs associated with each of the N service tiers that the end user is entitled to access;

decoding each of the decrypted programs; and distributing the decoded and decrypted programs to each of the display devices.

* * * * *

UNITED STATES PATENT AND TRADEMARK OFFICE
CERTIFICATE OF CORRECTION

PATENT NO. : 7,386,128 B2
APPLICATION NO. : 11/025304
DATED : June 10, 2008
INVENTOR(S) : Moroney Page 1 of 1

It is certified that error appears in the above-identified patent and that said Letters Patent is hereby corrected as shown below:

ON THE FACE PAGE:
In Field (56), under "U.S. PATENT DOCUMENTS", in Column 1, Line 10: Please delete "713/138" and replace with --713/168--

COLUMN 6:
Lines 46-47: In Claim 4, please delete "encryptionldecryption" and replace with --encryption/decryption--
Line 66: In Claim 6, please delete "encryptionldecryption" and replace with --encryption/decryption--

COLUMN 7:
Line 14: In Claim 9, please delete "encryptionldecryption" and replace with --encryption/decryption--

COLUMN 8:
Line 10: In Claim 11, please delete "encryptionldecryption" and replace with --encryption/decryption--

Signed and Sealed this

Twenty-second Day of September, 2009

David J. Kappos
*Director of the United States Patent and Trademark Office*